United States Patent [19]

Bohn et al.

[11] Patent Number: 5,311,344

[45] Date of Patent: May 10, 1994

[54] BIDIRECTIONAL LIGHTWAVE TRANSMISSION SYSTEM

[75] Inventors: Peter P. Bohn, Budd Lake; Thomas H. Wood, Holmdel, both of N.J.

[73] Assignee: AT&T Bell Laboratories, Murray Hill, N.J.

[21] Appl. No.: 939,269

[22] Filed: Sep. 2, 1992

[51] Int. Cl.$^5$ .............................................. H04J 14/02
[52] U.S. Cl. ...................................... 359/125; 359/120; 359/132; 359/137; 359/152
[58] Field of Search ........................... 359/120–121, 359/123, 113, 125, 132–133, 137, 143, 152, 173, 179

[56] References Cited

U.S. PATENT DOCUMENTS

| | | | |
|---|---|---|---|
| 4,726,010 | 2/1988 | Ali et al. | 359/119 |
| 5,119,223 | 6/1992 | Panzer et al. | 359/123 |
| 5,221,983 | 6/1993 | Wagner | 359/120 |

FOREIGN PATENT DOCUMENTS 8909518 10/1989 World Int. Prop. O. .......... 359/137

Primary Examiner—Richard E. Chilcot, Jr.
Assistant Examiner—K. Negash
Attorney, Agent, or Firm—Gregory C. Ranieri

[57] ABSTRACT

Bidirectional, non-interfering transmission of broadband services on a single fiber is accomplished by simultaneously combining wavelength-division, time-division, and subcarrier multiplexing on the downstream and upstream transmissions. High speed electrical data signals are time-division multiplexed at the exchange into a composite signal which modulates a standard diode laser operating at a first wavelength. Data signals from an individual subscriber are modulated onto a subcarrier designated solely for the particular subscriber which, in turn, modulates a laser operating at a second wavelength. Extraction and insertion of the upstream and downstream transmissions at the subscriber and exchange locations is accomplished with wavelength selective couplers.

19 Claims, 1 Drawing Sheet

BIDIRECTIONAL LIGHTWAVE TRANSMISSION SYSTEM

TECHNICAL FIELD

This invention relates to lightwave transmission systems and, more particularly, local loop systems employing fiber-in-the-loop technology.

BACKGROUND OF THE INVENTION

Broadband integrated digital services are possible in network architectures having fiber in the subscriber loop. Many different network designs have been proposed to handle the broadband service such as BISDN. While passive optical network designs are becoming a network characteristic of choice, the strategy governing communication between the subscriber and the exchange or central office is far from settled. Most proposed strategies involve the use of a single multiplexing technique such as either time-division (TDM) or wavelength-division (WDM) or subcarrier (SCM) multiplexing.

One exemplary network was reported by McGregor et al. in *Journal of Lightwave Technology*, Vol. 7, No. 11, pp. 1752-8 (1989) involving the use of TDM for both downstream (exchange to subscriber) and upstream (subscriber to exchange) data transmission and WDM to separate the downstream transmission from the upstream transmission. This network utilized bidirectional transmission over a single optical fiber by requiring the presence of 10 μs time guard bands around the data for each transmission direction. The time guard bands prevented upstream and downstream data collisions. A wavelength independent, three-port optical connector at the exchange end of the network facilitated the insertion and removal of data.

Even though the prototype described in the article utilized one fiber for bidirectional transmission, improvements to the prototype included the use of separate fibers for each transmission direction. This improvement offered the dual effects accomodating optical reflections in practical optical distribution plants and eliminating the need for time guard bands. In this dual fiber architecture, McGregor et al. suggested the use of subcarrier multiplexing over the upstream fiber. Unfortunately, the improvements required a duplication of optical fiber installations to support each separate transmission direction. Additionally, the number of splices, connectors, and couplers doubled over the single, bidirectional transmission fiber network. As such the proposed network is incapable of being deployed over existing optical fiber installations without significantly increased costs.

SUMMARY OF THE INVENTION

Bidirectional, non-interfering transmission of broadband services on a single fiber is accomplished in accordance with the principles of the present invention by judiciously and simultaneously combining wavelength-division, time-division, and subcarrier multiplexing on the downstream and upstream transmissions. High speed electrical data signals are time-division multiplexed at the exchange into a composite signal which modulates a standard diode laser operating at a first wavelength. Data signals from an individual subscriber are modulated onto a subcarrier designated solely for the particular subscriber which, in turn, modulates a laser operating at a second wavelength. Extraction and insertion of the upstream and downstream transmissions at the subscriber and exchange locations is accomplished with wavelength selective couplers. In one example, the frequency spectra of the upstream and downstream signals are substantially mutually exclusive thereby eliminating the chance for cross-talk and other interference.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

The deployment of fiber in the loop is considered essential for the eventual provision of broadband services such as BISDN over telephone networks. Many networks use a "fiber to the pedestal (FTTP)" or "fiber in the loop (FITL)" architecture, where one or two transport optical fibers connect an exchange or central office at the "head end" of the network to a pedestal serving subscribers at the remote end of the network. Each pedestal may serve 4–24 subscribers with traditional copper wires providing the final 100 m of transport to a subscriber premises. These networks have been limited in their ability to provide each subscriber with bidirectional low-speed voice and data transport (perhaps several 64 Kbps channels) along with analog broadcast video service. With the expected demand for broadband integrated digital services having 622 Mbps (OC-12) outbound service and 155.5 Mbps (OC-3) return service to each of four subscribers, the need to upgrade the present low bandwidth networks has been recognized. Moreover, considerable interest has been focussed on the opportunity to accomplish the upgrade without modifying the installed base of transport fibers.

The current, low-speed fiber network is upgradeable to handle the broadband services in accordance with the principles of the present invention by using coarse wavelength-division multiplexing (WDM) at each end of the network together with time-division multiplexing (TDM) for outbound service ("downstream") and subcarrier multiplexing (SCM) for subscriber inbound service ("upstream"). The upgraded network is a Passive Optical Network (PON), and is wavelength-independent which permits further upgrading without difficulty.

Figure 1:
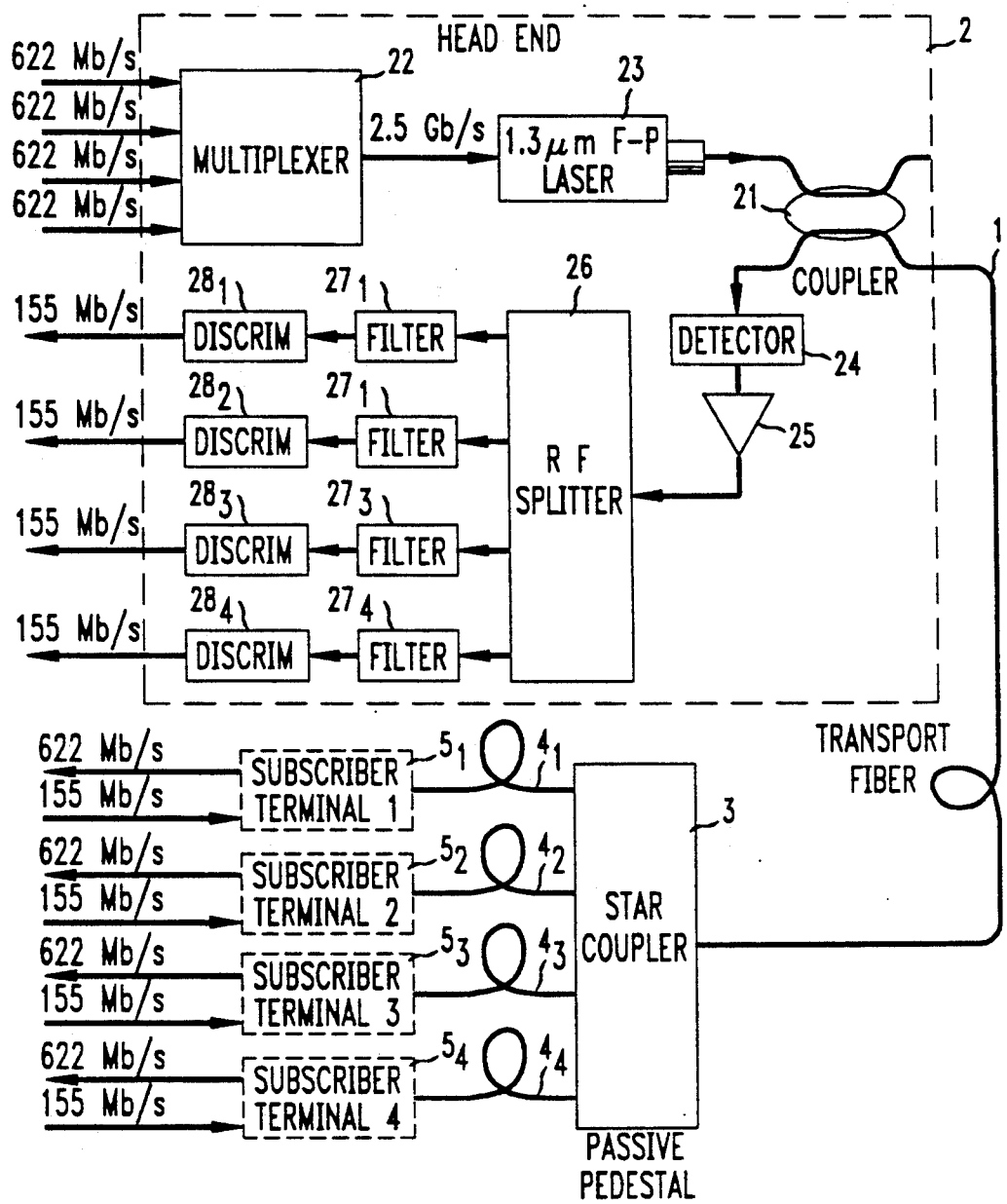
FIGs. 1 and 2 show a simplified block diagram of a passive optical network realized in accordance with the principles of the present invention.
Figure 2:
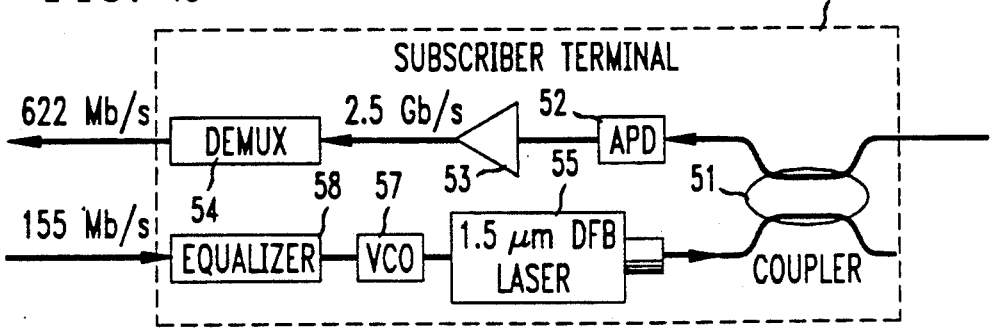

A schematic diagram of an exemplary embodiment of the network is shown in FIGS. 1 and 2. A 9.4 km long single-mode transport fiber 1 connects head end 2 with pedestal 3, which contains only a passive, wavelength-independent 1×4 optical star coupler. The total loss of the transport fiber was 7.1 dB and 5.9 dB at the outbound (1.3 μm) and inbound (1.5 μm) transmission wavelengths, respectively. Short pieces of single mode fiber 4, 125 m. long, connect the four outputs of the pedestal with respective "distant" subscriber terminals 5 normally located on subscriber premises. As depicted, each subscriber receives a high speed data signal (622 Mbps, OC-12) on the outbound service and transmits a moderately high speed data signal (155 Mbps, OC-3) on the inbound service.

The head end unit includes an outbound service transmitter, an inbound service receiver, and a wavelength selective coupling element for connecting the service to and from the transport fiber. As such, the head end unit operates as a transceiver. Wavelength selective coupling element 21 is necessary for launching the 1.3 μm wavelength band for outbound transmission, and for extracting the 1.5 μm wavelength band for inbound transmission. The wavelength selective coupling element couples substantially the entire signal from the outbound service transmitter into the transport fiber while simultaneously extracting substantially the entire inbound signal for the receiver.

Outbound service transmitter includes multiplexer 22 and laser 23. Outbound service is provided by time-division multiplexing four 622 Mbps baseband signals into a single 2.488 Gbps (OC-48) baseband signal using multiplexer 22. Electro-optical conversion of this baseband signal is accomplished by directly modulating laser 23. External modulation of laser 23 is not shown in FIG. 1 but is contemplated for use therewith as a substitute for direct modulation. The output from laser 23 is optically coupled into wavelength selective coupler 21 wherein the outbound optical signal is coupled over to the coupler output port connected to transport fiber 1.

Laser 23 is exemplarily realized as a 1.31 μm Fabry-Perot laser. This type of laser is quite common and exhibits an inherently multimode spectral response. Fabry-Perot lasers are generally inexpensive and possess excellent linearity and speed characteristics.

As described above, coupler 21 is also connected between the transport fiber and the inbound service receiver. The inbound service receiver includes photodetector 24, amplifier 25, RF power splitter 26, bandpass filters 27, and discriminators 28.

Photodetector 24 converts the received inbound signal from coupler 21 into an electrical signal which is then amplified by amplifier 25. The optical inbound signal, as will be discussed in more detail below, comprises a group of subcarrier multiplexed signals, one subcarrier per subscriber, propagating in transport fiber 1. Splitter 26 has one input port and at least one output port corresponding to each subscriber. Since there are four subscribers in FIG. 1, the RF splitter has four output ports. Splitter 26 distributes substantially equal amounts of the signal at the input port to each output port. From the RF splitter, the signals are frequency demultiplexed to recover the subscriber signals which were previously subcarrier multiplexed. In this arrangement, bandpass filter 27 and discriminator 28 cooperate to recover a particular subscriber signal. For example, the bandpass filter $27_1$ is tuned to 2.3 GHz to extract the signals from subscriber 1 at terminal $5_1$; the bandpass filter $27_2$ is tuned to 2.6 GHz to extract the signals from subscriber 2 at terminal $5_2$; the bandpass filter $27_3$ is tuned to 2.9 GHz to extract the signals from subscriber 3 at terminal $5_3$; and the bandpass filter $27_4$ is tuned to 3.2 GHz to extract the signals from subscriber 4 at terminal $5_4$. Each exemplary filter exhibited a bandwidth of 290 MHz. Discriminator 28 was a delay line discriminator for converting the received signals from FSK to ASK. Inbound service signals for a particular subscriber are output from a particular discriminator.

The passive pedestal is at the remote end of the transport fiber. One exemplary embodiment of the passive pedestal is shown in FIG. 1 as star coupler 3. Star coupler 3 provides the dual functions of distributing signals to the subscriber terminals and combining signals from the subscriber terminals. The star coupler is configured to have at least one output port and N input ports wherein N is at least the total number of subscribers connected to the pedestal. As shown in FIG. 1, star coupler 3 is a 4×1 port device. Short fibers 4 connect the pedestal to the terminals.

Each subscriber has an associated terminal which is used for communicating with the head end. Each subscriber terminal 5 as shown in FIG. 2 includes an outbound service receiver, an inbound service transmitter, and a wavelength selective coupling element 51. As such, the subscriber terminal is a transceiver. Wavelength selective coupling element 51 is necessary for launching the 1.5 μm wavelength band for inbound transmission, and for extracting the 1.3 μm wavelength band for outbound transmission. The wavelength selective coupling element couples substantially the entire signal from the inbound service transmitter into the transport fiber while simultaneously extracting substantially the entire outbound signal for the receiver.

The outbound service receiver includes photodetector 52, amplifier 53, and time-division demultiplexer 54 for recovering the information from the time slots assigned to a corresponding subscriber. Photodetector 52, shown in FIG. 1 as an InGaAs avalanche photodetector, converts the received, broadband, outbound service signal from the optical to the electrical domain. Amplifier 53 such as a GaAs transimpedance amplifier increases the power in the signal output from the detector. Demultiplexer 54 provides the necessary time-division demultiplexing to recover the signal destined for the associated subscriber. That is, demultiplexer 54 in subscriber terminal 1 extracts the 622 Mbps outbound signal sent to subscriber 1 via multiplexer 22.

The inbound service transmitter in each subscriber terminal includes equalizer 58, voltage-controlled oscillator 57, and laser 55. Equalizer 58 shapes the subscriber input signal (155 Mbps) to compensate for voltage-controlled oscillator characteristic variations with respect to frequency.

Voltage-controlled oscillator 57 is tuned to a center frequency corresponding to the assigned subcarrier for the associated subscriber. In the example of FIGS. 1 and 2, subscriber 1 at terminal $5_1$ is assigned a 2.3 GHz subcarrier frequency; subscriber 2 at terminal $5_2$ is assigned a 2.6 GHz subcarrier frequency; subscriber 3 at terminal $5_3$ is assigned a 2.9 GHz subcarrier frequency; and subscriber 4 at terminal $5_4$ is assigned a 3.2 GHz subcarrier frequency. Generally, the highest subcarrier frequency is chosen to be less than twice the lowest subcarrier frequency. Selection of the subcarrier frequencies is performed to insure that second harmonic distortion from the lowest frequency resulting from laser nonlinearities does not interfere with any other frequency. Additionally, the minimum subcarrier frequency has been chosen to be greater than 0.7 times the bit rate of the baseband signal to insure that the inbound signal at this subcarrier frequency does not interfere with the outbound signal in the outbound receiver. The factor 0.7 relates to the 3 dB point of the outbound receiver. The voltage-controlled oscillator then responds to the data at the subscriber terminal input and produces a frequency-shift keying (FSK) output at the designated subcarrier frequency. A modulation index of m=0.4 was utilized in experimental practice. The FSK output signal is applied to a laser 55 for directly modulating the laser to a depth of approximately 80%.

In one example, laser 55 is realized as a distributed feedback (DFB) laser operating in the 1.5 μm band. For subscribers 1 through 4, the DFB lasers operated between 1.527 μm and 1.545 μm. For this type of subcarrier modulation, it has been recognized that optical heat interference noise problems can occur when the laser wavelengths become too close due to temperature-induced or carrier-induced shifts, for example. The optical heat interference noise will occur at a frequency related to the wavelength difference between the subscriber terminal lasers 55. For example, a wavelength separation of 0.5 Å corresponds to an interference noise center frequency of approximately 6 GHz. In experimental practice, the lasers 55 in the subscriber terminals were separated from each other by at least 1 Å, so that the interference noise center frequency occurred at approximately 12 GHz. Because each laser was modulated by only a single channel, and the frequency band was restricted to less than an octave, problems of intermodulation and second harmonic distortion commonly found in analog fiber systems were greatly reduced.

Optical isolators were not used in the network shown in FIG. 1, however, such use is contemplated to prevent reflections between lasers 23 and 55 and their respective couplers 21 and 51.

In the passive pedestal, subcarrier multiplexed outputs from each of the subscriber inbound transmitters are optically combined. By performing an optical summation in the star coupler, there is no problem with intermodulation products from the multiple channels and it is possible to achieve deeper modulation of the individual lasers.

The use of three levels of multiplexing results in a robust system with little interchannel interference and relative insensitivity to reflections. Reflections are problematic because the high power reflected signals can overwhelm a photodetector at that wavelength. Coarse WDM can be done with readily-available fused couplers, and provides much better immunity to reflections than is possible in single-wavelength systems. TDM at the head end allows the system to operate with a single outbound laser, although it requires four optical receivers and four demultiplexers that run at the aggregate high bit-rate. Finally, the use of SCM avoids the difficult problems of 1) synchronization of clocks at the four separate subscriber locations that would be required for a simple TDM system that combines signals in a passive network and 2) tight control on laser wavelength that would be required in a narrowband WDM system. In addition, the SCM system encodes the inbound service data into frequency bands separate from the outbound service data, which allows each receiver to electrically filter out the strong locally generated signal, further increasing the system's immunity to reflections.

It is contemplated that the wavelengths described in FIG. 1 for the wavelength division multiplexing can be reversed so that the outbound service is transmitted at a higher wavelength than the inbound service. But it should be appreciated that the increased dispersive effects on a long wavelength transmission (outbound) may significantly degrade the system performance. It should be understood by persons skilled in the art that the number of subscribers can be increased or decreased with the concomitant change in the number of terminals, the size of the passive pedestal, the multiplexing capability of multiplexer 22, and the number of demultiplexers in the inbound services receiver.

What is claimed is:

1. A lightwave transmission system having a first end transceiver coupled to a lightwave transmission medium wherein the transmission medium connects the first end transceiver to at least a first second end transceiver coupled to a remote end of the lightwave transmission medium, the transmission medium including at least one optical fiber, the first end transceiver including outbound apparatus and inbound apparatus, the outbound apparatus operating substantially at a first optical wavelength for transmitting a first optical signal on the transmission medium via baseband signalling, the inbound apparatus operating substantially at a second optical wavelength different from the first optical wavelength for receiving a second optical signal from the transmission medium via at least a first subcarrier multiplexed signal at a first assigned subcarrier frequency, the transceiver further comprising means for coupling optically and wavelength selectively an input port of the inbound apparatus and an output port of the outbound apparatus to one optical fiber of the lightwave transmission medium.

2. The system as defined in claim 1 wherein the outbound apparatus further comprises means for time division multiplexing a plurality of input signals into a time division multiplexed signal and means responsive to the time division multiplexed signal for generating the first optical signal.

3. The system as defined in claim 1 wherein the generating means further includes a light source for generating the first optical signal at the first optical wavelength.

4. The system as defined in claim 3 wherein the light source is a Fabry-Perot laser.

5. The system as defined in claim 3 wherein the light source is directly modulated by the time division multiplexed signal.

6. The system as defined in claim 2 wherein the inbound apparatus further comprises means for detecting the second optical signal.

7. The system as defined in claim 2 wherein the inbound apparatus further comprises a plurality of subcarrier multiplexed signal receivers and means connected to an output of the detecting means for distributing the received second signal to each subcarrier multiplexed signal receiver.

8. The system as defined in claim 2 wherein each subcarrier multiplexed signal receiver includes means tuned to an assigned subcarrier frequency for selecting the subcarrier multiplexed signal substantially at the assigned subcarrier frequency and means connected to the selecting means for demodulating the subcarrier multiplexed signal.

9. The system as defined in claim 2 wherein the demodulating means includes frequency discriminating means for the subcarrier multiplexed signal from a frequency shift keying signal to an amplitude shift keying signal.

10. The system as defined in claim 2 wherein the second end transceiver comprises inbound apparatus and outbound apparatus, the inbound apparatus operating at the second optical wavelength for transmitting the second optical signal as at least the first subcarrier multiplexed signal, the outbound apparatus operating at the first optical wavelength for receiving the first optical signal, the transceiver further comprising means for optically and wavelength selectively coupling an input port of the outbound apparatus and an output port of the inbound apparatus to the one optical fiber of the lightwave transmission medium.

11. The system as defined in claim 3 wherein the transmission medium includes means substantially at the remote end of the transmission medium for coupling optically a plurality of second end transceivers to the one optical fiber and for distributing signals to and from the second end transceivers and wherein the system includes a plurality of second end transceivers.

12. The system as defined in claim 3 wherein the coupling and distributing means includes a star coupler having at least one input port coupled to the one optical fiber and a plurality of output ports, each output port being connected to one second end transceiver.

13. The system as defined in claim 3 wherein each outbound apparatus of the second end transceiver comprises means for detecting the first optical signal and generating a time division multiplexed signal therefrom and means for demultiplexing the time division multiplexed signal into one of a plurality of input signals.

14. The system as defined in claim 3 wherein the transmitting means of each inbound apparatus includes means for modulating a subscriber input signal onto a subcarrier signal at an assigned subcarrier frequency and a light source means responsive to the modulated subcarrier signal from the modulating means for generating a subcarrier multiplexed signal component of the second optical signal, the assigned subcarrier frequency for one second end transceiver being substantially different from the assigned subcarrier frequency or other second end transceivers, and the second optical wavelength for one second end transceiver is different from the second optical wavelength for other second end transceivers.

15. The system as defined in claim 14 wherein a maximum assigned subcarrier frequency is less than twice a minimum assigned subcarrier frequency.

16. The system as defined in claim 14 wherein a minimum subcarrier frequency is selected to be greater than approximately 0.7 times a bit rate for the time division multiplexed signal.

17. The system as defined in claim 14 wherein the light source means is a substantially single frequency laser.

18. The system as defined in claim 3 wherein the light source means is directly modulated by the modulated subcarrier signal.

19. The system as defined in claim 1 wherein the first optical wavelength is approximately 1.3 $\mu$m and the second optical wavelength is approximately 1.5 $\mu$m.

* * * * *